(12) United States Patent
Molter et al.

(10) Patent No.: US 9,850,762 B2
(45) Date of Patent: Dec. 26, 2017

(54) DUST MITIGATION FOR TURBINE BLADE TIP TURNS

(71) Applicant: General Electric Company, Schenectady, NY (US)

(72) Inventors: Stephen Mark Molter, Cincinnati, OH (US); Timothy Deryck Stone, LIberty Township, OH (US)

(73) Assignee: General Electric Company, Schenectady, NY (US)

(*) Notice: Subject to any disclaimer, the term of this patent is extended or adjusted under 35 U.S.C. 154(b) by 1166 days.

(21) Appl. No.: 13/800,647

(22) Filed: Mar. 13, 2013

(65) Prior Publication Data

US 2014/0286790 A1   Sep. 25, 2014

(51) Int. Cl.
*F01D 5/18* (2006.01)
*F01D 5/20* (2006.01)

(52) U.S. Cl.
CPC .............. *F01D 5/187* (2013.01); *F01D 5/18* (2013.01); *F01D 5/186* (2013.01); *F01D 5/188* (2013.01); *F01D 5/20* (2013.01); *F05D 2240/307* (2013.01); *F05D 2250/185* (2013.01); *F05D 2260/20* (2013.01); *F05D 2260/201* (2013.01); *F05D 2260/202* (2013.01); *F05D 2260/204* (2013.01); *F05D 2260/2212* (2013.01); *F05D 2260/607* (2013.01); *Y02T 50/676* (2013.01)

(58) Field of Classification Search
CPC .......... F01D 5/187; F01D 5/186; F01D 5/188; F01D 5/18; F01D 5/20; F05D 2250/185; F05D 2260/20; F05D 2260/204; F05D 2260/2212; F05D 2260/202; F05D 2260/201; F05D 2240/307; Y02T 50/676

USPC .............................................. 416/96 R, 97 R
See application file for complete search history.

(56) References Cited

U.S. PATENT DOCUMENTS

| 4,293,275 A | 10/1981 | Kobayashi et al. |
| 4,416,585 A | 11/1983 | Abdel-Messeh |
| 4,474,532 A | 10/1984 | Pazder |
| 4,500,258 A * | 2/1985 | Dodd ............ F01D 5/187 |
| | | 416/96 R |
| 4,515,526 A | 5/1985 | Levengood |
| 4,775,296 A | 10/1988 | Schwarzmann et al. |
| 5,288,207 A | 2/1994 | Linask |
| 5,395,212 A | 3/1995 | Anzai et al. |

(Continued)

FOREIGN PATENT DOCUMENTS

| CN | 1305049 A | 7/2001 |
| CN | 1944959 A | 4/2007 |

(Continued)

OTHER PUBLICATIONS

Unofficial English Translation of Chinese Office Action issued in connection with corresponding CN Application No. 201480014577.6 dated Mar. 4, 2016.

(Continued)

*Primary Examiner* — Mark Laurenzi
*Assistant Examiner* — Wesley Harris
(74) *Attorney, Agent, or Firm* — General Electric Company; William Scott Andes

(57) ABSTRACT

A dust mitigation system for airfoils includes a plurality of contoured tip turns which curve about at least two axes. This inhibits recirculation areas common within airfoils and further inhibits dust build up within the cooling flow path of the airfoil.

20 Claims, 7 Drawing Sheets

(56) References Cited

U.S. PATENT DOCUMENTS

| | | | |
|---|---|---|---|
| 5,484,258 A | 1/1996 | Isburgh et al. |
| 5,611,662 A | 3/1997 | Cunha |
| 5,681,144 A | 10/1997 | Spring et al. |
| 5,702,232 A | 12/1997 | Moore |
| 5,704,763 A | 1/1998 | Lee |
| 5,931,638 A | 8/1999 | Krause et al. |
| 6,099,251 A | 8/2000 | LaFleur |
| 6,174,134 B1 | 1/2001 | Lee et al. |
| 6,254,346 B1 | 7/2001 | Fukuno et al. |
| 6,290,462 B1 | 9/2001 | Ishiguro et al. |
| 6,331,098 B1 | 12/2001 | Lee |
| 6,406,260 B1 | 6/2002 | Trindade et al. |
| 6,416,283 B1 | 7/2002 | Johnson et al. |
| 6,582,584 B2 | 6/2003 | Lee et al. |
| 6,607,355 B2 | 8/2003 | Cunha et al. |
| 6,609,884 B2 | 8/2003 | Harvey |
| 6,644,921 B2 | 11/2003 | Bunker et al. |
| 6,705,836 B2 | 3/2004 | Bourriaud et al. |
| 6,722,134 B2 | 4/2004 | Bunker |
| 6,890,154 B2 | 5/2005 | Cunha |
| 6,916,150 B2 | 7/2005 | Liang |
| 6,932,573 B2 | 8/2005 | Liang |
| 6,939,102 B2 | 9/2005 | Liang |
| 6,981,846 B2 | 1/2006 | Liang |
| 6,984,102 B2 | 1/2006 | Bunker et al. |
| 7,094,031 B2 | 8/2006 | Lee et al. |
| 7,104,757 B2 | 9/2006 | Gross |
| 7,128,533 B2 | 10/2006 | Liang |
| 7,137,781 B2 | 11/2006 | Harvey et al. |
| 7,186,084 B2 | 3/2007 | Bunker et al. |
| 7,195,458 B2 | 3/2007 | Liang |
| 7,244,101 B2 | 7/2007 | Lee et al. |
| 7,296,973 B2 | 11/2007 | Lee et al. |
| 7,300,242 B2 | 11/2007 | Liang |
| 7,303,376 B2 | 12/2007 | Liang |
| 7,377,746 B2 | 5/2008 | Brassfield et al. |
| 7,399,160 B2 | 7/2008 | Harvey et al. |
| 7,413,407 B2 | 8/2008 | Liang |
| 7,445,432 B2 | 11/2008 | Levine et al. |
| 7,520,723 B2 | 4/2009 | Liang |
| 7,534,089 B2 | 5/2009 | Liang |
| 7,547,191 B2 | 6/2009 | Liang |
| 7,637,720 B1 | 12/2009 | Liang |
| 7,665,965 B1 | 2/2010 | Liang |
| 7,690,892 B1 | 4/2010 | Liang |
| 7,699,583 B2 | 4/2010 | Cunha |
| 7,713,026 B1 | 5/2010 | Liang |
| 7,722,327 B1 | 5/2010 | Liang |
| 7,766,616 B2 | 8/2010 | Baldauf et al. |
| 7,806,658 B2 | 10/2010 | Liang et al. |
| 7,824,156 B2 | 11/2010 | Dellmann et al. |
| 7,866,948 B1 | 1/2011 | Liang |
| 7,938,624 B2 | 5/2011 | Tibbott |
| 7,985,050 B1 | 7/2011 | Liang |
| 8,523,527 B2 | 9/2013 | Lacy et al. |
| 2005/0214118 A1 | 9/2005 | Dodd |
| 2006/0099073 A1 | 5/2006 | Djeridane et al. |
| 2007/0297916 A1 | 12/2007 | Levine et al. |
| 2007/0297917 A1 | 12/2007 | Levine et al. |
| 2009/0087312 A1 | 4/2009 | Bunker et al. |
| 2010/0040480 A1 | 2/2010 | Webster et al. |
| 2010/0221121 A1 | 9/2010 | Liang |
| 2010/0226761 A1 | 9/2010 | Liang |
| 2010/0226791 A1 | 9/2010 | Fujimura et al. |
| 2010/0247328 A1 | 9/2010 | Cunha |
| 2010/0303635 A1 | 12/2010 | Townes et al. |
| 2011/0038709 A1 | 2/2011 | Liang et al. |
| 2011/0164960 A1 | 7/2011 | Maldonado |

FOREIGN PATENT DOCUMENTS

| | | |
|---|---|---|
| CN | 102191951 A | 9/2011 |
| EP | 1882817 A2 | 1/2008 |
| EP | 2087206 | 3/2010 |
| EP | 2746536 A1 | 6/2014 |
| JP | H05312002 | 11/1993 |
| JP | H062502 | 1/1994 |
| JP | H08271083 | 10/1996 |
| JP | H08338202 | 12/1996 |
| JP | 2002129903 | 5/2002 |

OTHER PUBLICATIONS

International Search Report and Written Opinion issued in connection with corresponding PCT Application No. PCT/US2014/017600 dated Oct. 27, 2014.

* cited by examiner

DUST MITIGATION FOR TURBINE BLADE TIP TURNS

CROSS-REFERENCE TO RELATED APPLICATIONS

None.

BACKGROUND

Present embodiments relate generally to cooling gas turbine engine airfoils. More specifically, but not by way of limitation, present embodiments relate to improving cooling of gas turbine airfoils by mitigating dust buildup within an airfoil.

In a gas turbine engine, air is pressurized in a compressor and mixed with fuel in a combustor for generating hot combustion gases which flow downstream through turbine stages. A typical gas turbine engine generally possesses a forward end and an aft end with its several core or propulsion components positioned axially therebetween. An air inlet or intake is located at a forward end of the engine. Moving toward the aft end, in order, the intake is followed by a fan, a compressor, a combustion chamber, and a turbine. It will be readily apparent from those skilled in the art that additional components may also be included in the engine, such as, for example, low-pressure and high-pressure compressors, and low-pressure and high-pressure turbines. This, however, is not an exhaustive list.

The compressor and turbine generally include rows of airfoils that are stacked axially in stages. Each stage includes a row of circumferentially spaced stator and a rotor assembly which rotates about a center shaft or axis of the turbine engine. A multi-stage low pressure turbine follows the multi-stage high pressure turbine and is typically joined by a second shaft to a fan disposed upstream from the compressor in a typical turbo fan aircraft engine configuration for powering an aircraft in flight. These turbine stages extract energy from the combustion gases.

The stator is formed by a plurality of nozzle segments which are abutted at circumferential ends to form a complete ring about the axis of the gas turbine engine. Each nozzle segment may comprise one or more vanes which extend between an inner band and an outer band. The stator nozzles direct the hot combustion gas in a manner to maximize extraction at the adjacent downstream turbine blades.

Turbine rotor assemblies typically include at least one row of circumferentially-spaced rotor blades. Each rotor blade includes an airfoil that having a pressure side and a suction side connected together at leading and trailing edges. Each airfoil extends radially outward from a rotor blade platform. Each rotor blade may also include a dovetail that extends radially inward from a shank extending between the platform and the dovetail. The dovetail is used to mount the rotor blade within the rotor assembly to a rotor disc or spool. Known blades are hollow such that an internal cooling cavity is defined at least partially by the airfoil, platform, shank, and dovetail.

In operation, air is pressurized in a compressor and mixed with fuel in a combustor for generating hot combustion gases which flow downstream through the multiple turbine stages. Typical gas turbine engines utilize a high pressure turbine and low pressure turbine to maximize extraction of energy from high temperature combustion gas. In the high pressure turbine, combustion gas engages the stator nozzle assembly, which directs the combustion gases downstream through the row of high pressure turbine rotor blades extending radially outwardly from a supporting rotor disc. A high pressure turbine first receives the hot combustion gases from the combustor. The high pressure turbine includes a first stage nozzle and a rotor assembly having a disk and a plurality of turbine blades. An internal shaft passes through the turbine and is axially disposed along a center longitudinal axis of the engine. Blades are circumferentially distributed on a rotor and extend radially causing rotation of the internal shaft. The internal shaft is connected to the rotor and the air compressor, such that the turbine provides a rotational input to the air compressor to drive the compressor blades. This powers the compressor during operation and subsequently drives the turbine. As the combustion gas flows downstream through the turbine stages, energy is extracted therefrom and the pressure of the combustion gas is reduced.

Jet engine operations in dusty, dirty and sandy regions such as the Middle East, India or China, have increased in recent years and future forecasts indicate this trend will at least continue, if not accelerate. Operations experience shows that dust and dirt from such environment adversely affects components in the engine. Particularly, air cooled turbine airfoils can be plugged by dust and dirt or cause coating of such built up on internal surfaces of the airfoil. This may lead to plugging or blocking of cooling holes as well as part distress and potential engine system failures.

Prior attempts to solve these blockage problems include enlarging cooling holes near tip turns. However, this method resulted in increased cooling flow, a negative for engine performance. Alternate attempts have included preventing the dust or dirt from entering the turbine blade. However, this attempt usually requires removal engine from of the wing for cleaning of dirt in the cooling air path. Additionally, trapped dirt may build to larger chunks which can release and quickly clog or block other cooling flow passages either within the airfoil or outside the part.

As may be seen by the foregoing, these and other deficiencies should be overcome to improve flow of cooling air through a rotor blade assembly.

SUMMARY

According to some embodiments, a turbine blade for improving dust mitigation comprises a leading edge, a trailing edge, at least one sidewall defining a pressure side extending between the leading edge and the trailing edge in a first direction, and a suction side extending between the leading edge and the trailing edge in a second direction, the blade extending radially from a blade root to a blade tip, the blade having a hollow cavity including a plurality of chambers for passage of cooling fluid, the plurality of chambers extending radially between the blade root and the blade tip, at least one of the chambers, having a tip turn which turns about 90 degrees near the blade tip, the tip turn including radiused corners to inhibit recirculation areas.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of this invention, and the manner of attaining them, will become more apparent and the dust mitigation structure for blade tip turns will be better understood by reference to the following description of embodiments taken in conjunction with the accompanying drawings, wherein.

DETAILED DESCRIPTION

Figure 1:
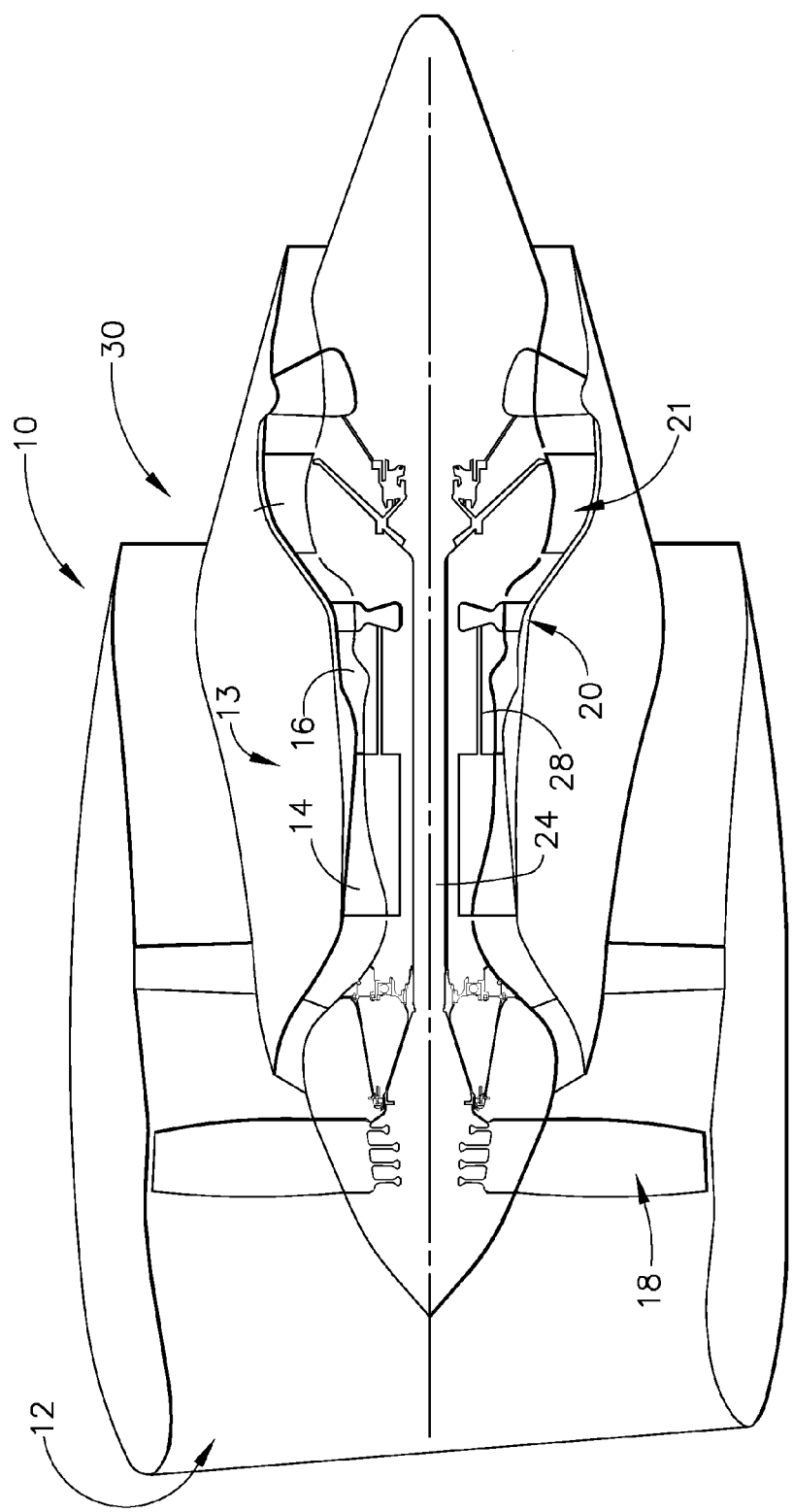
FIG. 1 is a schematic illustration of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring now to FIGS. 1-7, various embodiments of methods and apparatuses for mitigating dust in an airfoil are depicted. The embodiments provide curved and contoured tip turns from up-path to down-path, and vice-versa, to reduce recirculation areas and flow separation at corners, which turn for example at least 90 degrees.

The terms fore and aft are used with respect to the engine axis and generally mean toward the front of the turbine engine or the rear of the turbine engine in the direction of the engine axis.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rear or downstream, outlet end of the engine, or a component being relatively closer to the engine nozzle as compared to the engine inlet.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

Referring initially to FIG. 1, a schematic side section view of a gas turbine engine 10 is shown. The function of the gas turbine engine is to extract energy from high pressure and temperature combustion gases and convert the energy into mechanical energy for work. The gas turbine engine 10 has an engine inlet end 12 wherein air enters the core or propulsor 13 which is defined generally by a compressor 14, a combustor 16 and a multi-stage high pressure turbine 20. Collectively, the propulsor 13 provides thrust or power during operation. The gas turbine 10 may be used for aviation, power generation, industrial, marine or the like.

In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. A low pressure turbine 21 may also be utilized to extract further energy and power additional compressor stages.

Figure 2:
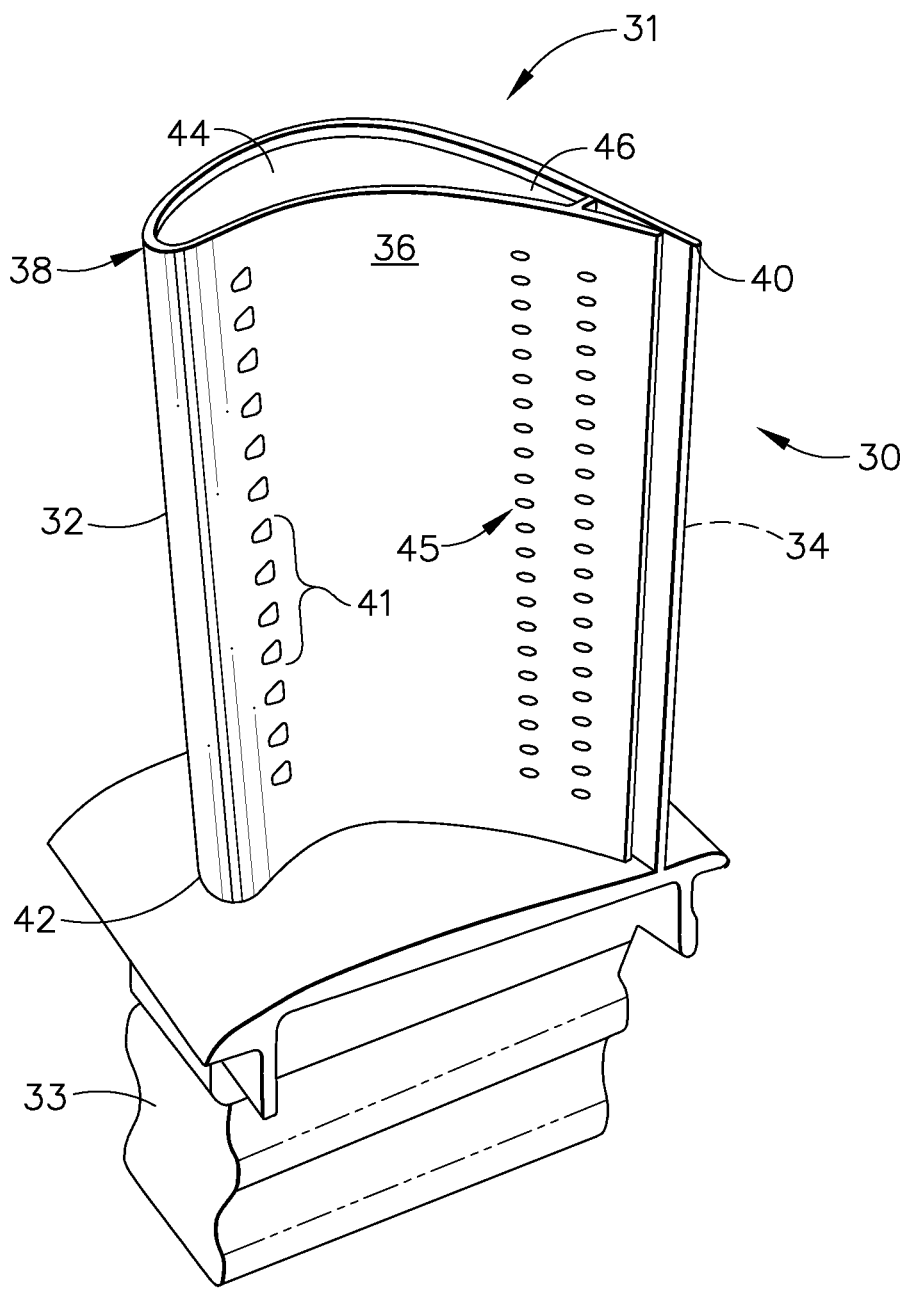
FIG. 2 is a perspective view of an exemplary rotor blade that may be used with the gas turbine shown in FIG. 1.

FIG. 2 is a perspective view of an exemplary rotor blade 30 that may be used with gas turbine engine 10 (shown in FIG. 1). Although an exemplary rotor blade is taught and shown, it is contemplated that any airfoil having cooling chambers therein may be improved by the present embodiments. Accordingly, it is within the scope of the instant disclosure that the teachings not be limited to a turbine rotor blade but instead may be applied to a broad range of airfoil shaped components requiring cooling. Each rotor blade 30 includes at least one sidewall 31 extending in two directions and forming a generally hollow airfoil 32. The depicted embodiment includes an integral dovetail 33 used for mounting blade 30 to a rotor disc (not shown) in a known manner. In one embodiment, a plurality of rotor blades 30 form a high pressure turbine rotor blade stage, for example in turbine 20 (FIG. 1) of gas turbine engine 10.

The at least one sidewall 31 of the airfoil 32 includes a first sidewall 34 and a second sidewall 36. The first and second sidewalls 34, 36 extend between the leading edge 38 and the trailing edge 40. First sidewall 34 is convex and defines a suction side of airfoil 32, and second sidewall 36 is concave and defines a pressure side of airfoil 32. Sidewalls 34 and 36 are connected together at a leading edge 38 and at an axially-spaced trailing edge 40 of airfoil 32 that is downstream from leading edge 38. This construction defines a hollow interior cavity 46 of the airfoil. Additionally, the sidewalls 34, 36 extend between the tip 44 and the root 42. Airfoil 32 includes a plurality of film holes 41 that are spaced radially along sidewalls 34 and 36 and between an airfoil tip 44 and a blade root 42 for discharging cooling fluid from airfoil 32 to facilitate cooling an outer surface 31 of the at least one sidewall 51. Airfoil 32 also includes a plurality of trailing edge slots 45 spaced radially between airfoil tip 44 and blade root 42 along trailing edge 40 for discharging cooling fluid from airfoil 32 to facilitate cooling airfoil trailing edge 40. Heat transfer enhanced by film holes 41 and trailing edge slots 45 facilitates cooling along airfoil outer surface of the at least one sidewall 31.

Figure 3:
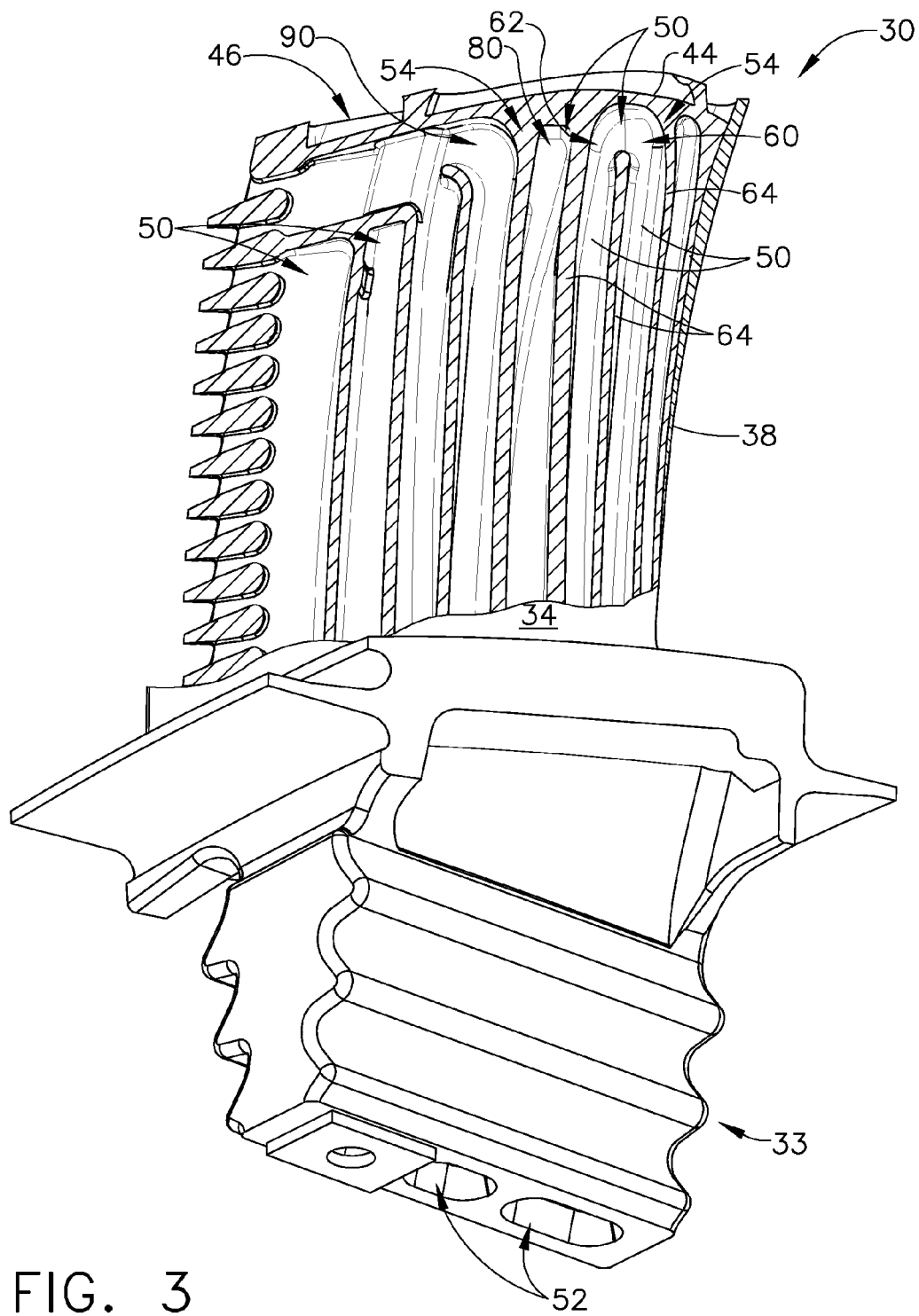
FIG. 3 is a lower isometric view of the rotor blade shown in FIG. 2 with a surface of the exemplary blade removed.

Referring now to FIG. 3, a lower perspective view of the exemplary turbine blade 30 is depicted from the suction side 34 with portions of the sidewall 31 removed to depict interior chambers 50. The first and second sidewalls 34 and 36, respectively, extend radially from the blade root 42 positioned adjacent dovetail 33 to the airfoil tip 44 which defines a radially outer boundary of the internal cavity 46. Cavity 46 is defined within airfoil 32 between sidewalls 34 and 36 and the leading and trailing edges 38, 40. In the exemplary embodiment, cavity 46 is divided into a plurality of cooling chambers 50 which form cooling circuits 54 that target specific areas of airfoil 32. The cooling chambers 50 provide for fluid movement in a radial direction between the root 42 (FIG. 2) and the tip 44 and generally through inter-cavity paths to define circuits 54. In the exemplary embodiment, five cooling circuits 54 are provided. However, this is non-limiting as various numbers of circuits 54 may be formed with cavities of varying sizes.

The cooling chambers 50 generally extend radially through the interior of the blade 30. The chambers 50 may also extend tangentially toward the trailing edge of the blade 30 in some embodiments. The chambers 50 may be joined near the tip 44 and the root 42 by one or more plurality of tip turns, for example tip turns 60, 62 for example.

The exemplary embodiment includes at least four circuits defined of one or more chambers 50. For example, the blade 30 may include an impingement circuit near the leading edge and a serpentine circuit adjacent to the impingement circuit toward the suction side of the blade, generally in the high curvature region of the blade. Additional circuits are located moving tangentially toward the trailing edge of the blade 30. The tip turns may turn from vertical or radially extending toward a trialing edge, or in a direction between the suction and pressure sides, for example.

The chambers 50 receive high pressure compressed air through apertures 52 located in the dovetail 33. The compressed air moves radially through the dovetail 33 and into the rotor blades 30. Within the blades 30 are a plurality of chambers 50 which are grouped together to define cooling circuits 54. Each circuit 54 is defined by two or more chambers 50 which extend at least radially upward and downwardly through the cavity 46 of the blade 30. The circuits 54 serpentine to provide flow paths for cooling air to move through the blade 30 and outwardly through the apertures 41, 45 and at the trailing edge 40.

As depicted in the instant embodiment, the chambers extend toward the blade tips 44 and turn 180 degrees. Each of these turns is typically formed to provide a contoured or smooth surface at 90 degree corners. For example, toward the leading edge 38 of the blade 30 a cooling circuit 54 includes a first corner or tip turn 60 and a second corner or tip turn 62 which connect an upwardly extending chamber 50 and downwardly extending adjacent chamber 50. The chambers 50 are defined by partitions 64 within the cavity 46 of the blade 30. The partitions 64 define walls of the chambers 50 throughout the cavity 46.

In order to improve flow of dust and dirt particles through these chambers 50 and at the tip turns 62, the partition walls 64 are contoured in two directions. Specifically, the partitions 64 defining the chambers 50 are contoured into the blade tip 44 and into the sidewall 31 radiused into the blade tip 44. Similarly, the upper surfaces of the tip turns are radiused into the sidewall 31 surfaces so that the tip turns defined by the first and second corners 60, 62 are radiused in about two axes. For example the tip turns may be curved about an axis extending between the pressure and suction sides, an axis may be extending tangentially or circumferentially, and an axis may be extending vertically or radially.

Figure 4:
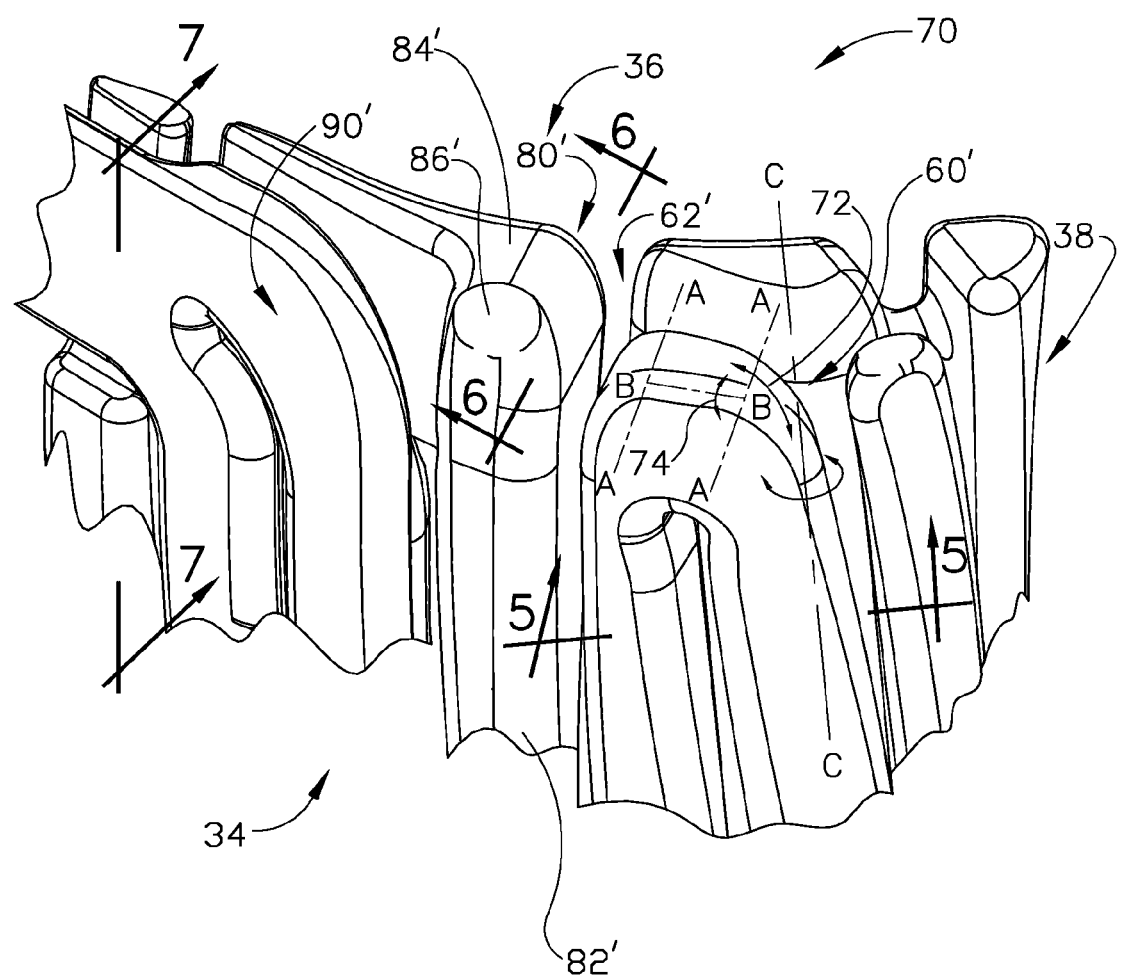
FIG. 4 is an upper isometric view of exemplary cores defining the flow chambers and circuits within the exemplary rotor blade of FIG. 2.

Referring now to FIG. 4, an upper isometric view of cores 70 utilized to form the chambers 50 within the blade 30 is depicted. These cores 70 are useful to depict the shapes of the interior chambers 50. For ease of reference, the leading edge 38 location is indicated to generally provide help in understanding the layout of cores 70 relative to the blade 30. The suction side 34 and pressure side 36 are also generally indicated relative to the placement of the cores 70 and the leading edge 38. The tip turn cores 60', 62' are depicted and correspond to the tip turns 60, 62 of FIG. 3. The tip turn core 60' curves from a generally vertical direction to a horizontal direction about curve 72. This curve 72 bends about axis A-A. Additionally, the tip turn 60 curves about a second axis B-B forming a second curve or radius 74. The second tip turn 62' also curves about two axes A-A and B-B.

Referring still to FIG. 4, an alternate portion of cores 70 is depicted again with curvatures along the outer surface about at least two axes. The core portion 80' corresponding to a chamber of the blade 30 includes an upwardly extending portion 82' and a curved upper surface 84' for the second curved surface 86'. The core portion 80' is again curved about two axes to provide improved contour for dust or dirt mitigation within the blade.

An additional chamber 90' is depicted with multiple curved surfaces to eliminate recirculation areas. The chambers 50 extend radially to tip turns 60, 62. Each of these tip turns includes radiused surfaces about at least two axes.

Figure 5:
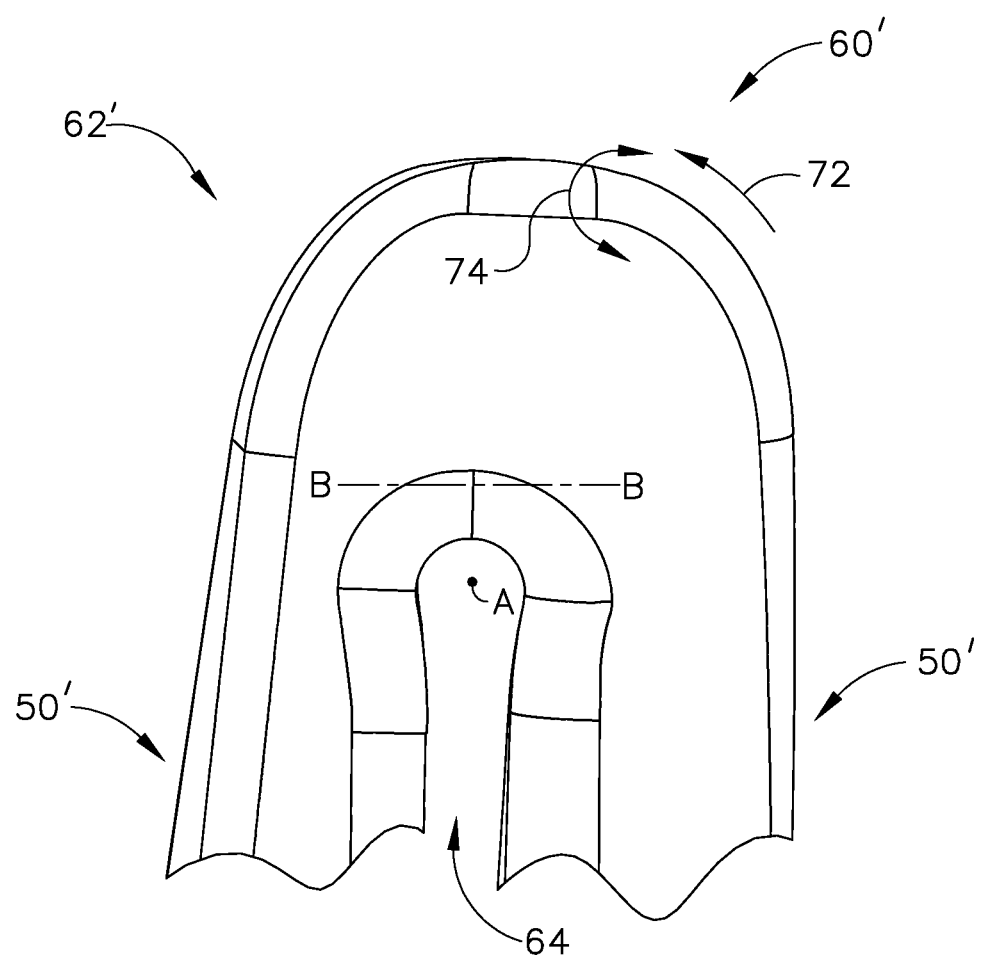
FIG. 5 is a side view of one core for forming a flowpath through an exemplary blade.

Referring now to FIG. 5, a side view of tip turns 60, 62 is depicted. One of the two axes, axis A is depicted at the center of the curvature formed by the two tip turns 60, 62. The central portion between the chambers 50' forms a partition in the finished part. The upper most end of the partition 64 is also curved about two axes, axis A and a horizontal axis, axis B. The curved tip turns 60, 62 maintain a continuous flow with the smooth contours rather than discontinuous sides which abruptly join at corners. As a result, recirculation is limited and dust build up inside the chambers 50 is reduced.

Figure 6:
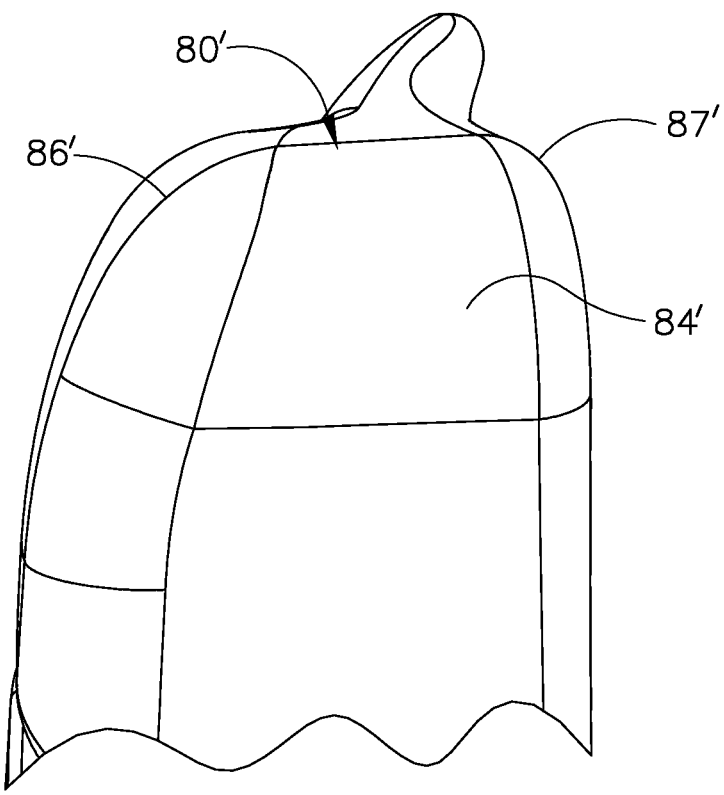
FIG. 6 is an isometric view of an alternate core for forming a flowpath through the exemplary blade.

Referring now to FIG. 6, an isometric end view of the core 80' is shown. This view depicts approximation of the surface of the chamber 80. As shown in this view, the two curved surfaces 84', 86' curve about perpendicular axes to provide two smooth radiused surfaces. Also, the surface 87' is also curved which represents the surface toward the inside of the blade 30. Again, the curvature eliminates recirculation areas known with perpendicular surfaces which join at sharp corners such as those of the prior art.

Figure 7:
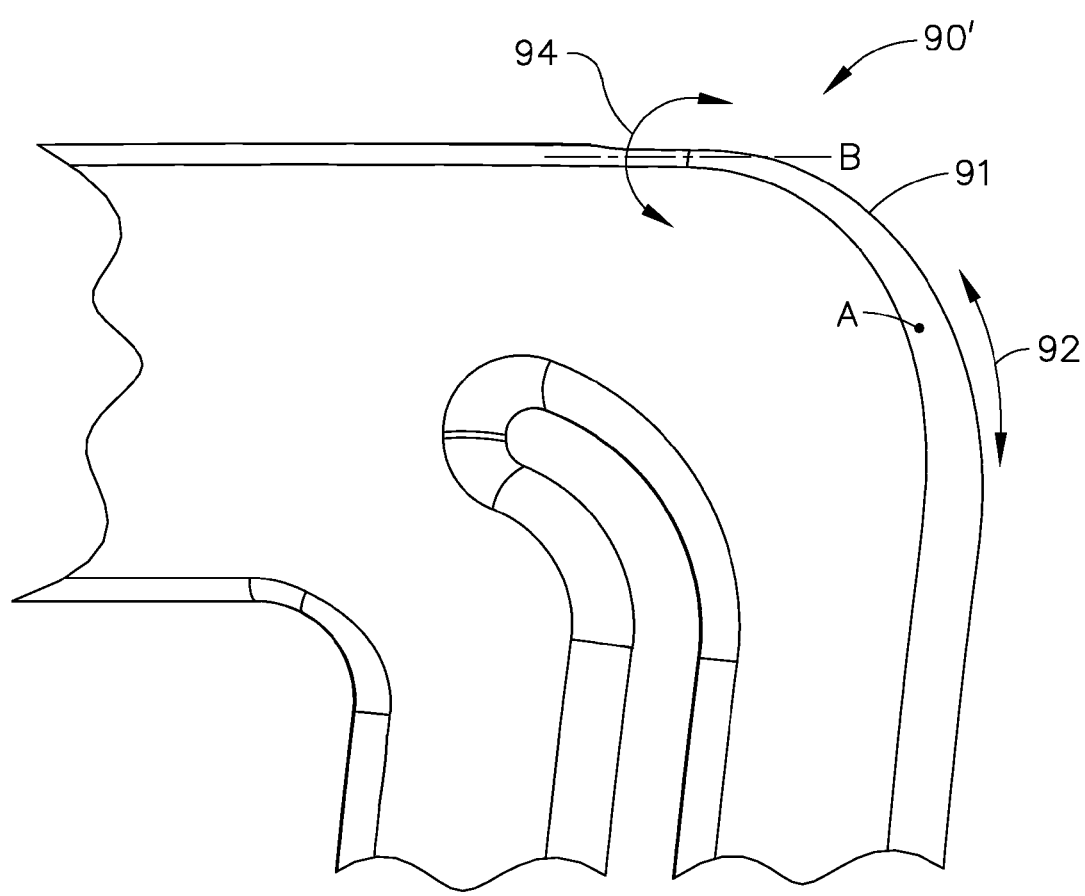
FIG. 7 is a side view of another core for forming a flowpath through the exemplary blade.

Referring now to FIG. 7, a side view of a tip turn core 90' is depicted having an outer surface 91' which corresponds to the outer curvature of tip turn 90 toward the sidewall of suction side 34. The core 90' corresponding to the tip turn 90 curves about two axes. The first axis, axis A, extends into the page providing curvature 92. The second axis, axis B, provides for curvature 94. Thus, the smooth contoured surface of the tip turn 90 again precludes recirculation areas from allowing dust build up. Instead, dust build up is mitigated within the blade. This allows improved cooling of the turbine blades and results in longer engine time on the wing before maintenance requires cleaning.

A Computational Fluid Dynamics (CFD) analysis may be utilized to approximate flow patterns through the various chambers 50 depicted with the blade 30. Once these flow patterns are determined, the curvatures needed within the chambers and, specifically at the tip turns, can be determined and subsequently formed for the molding process utilized to manufacture blades.

The above-described rotor blade is cost-effective and highly reliable. The rotor blade includes an airfoil having a number of cooling circuits which target cooling on the leading edge, pressure side, and suction side of the airfoil. A number of cooling techniques are employed to cool the exterior sidewalls of the airfoil, such as impingement cooling and near-wall cooling. The arrangement of the various chambers within the cooling circuits facilitates isolation and insulation of cooling fluid, further facilitating cooling of the airfoil as a result of cooler cooling fluid passing through the various chambers. Such an arrangement is made possible by advances in fabrication techniques, including, but not limited to, rapid prototyping of ceramic cores. More specifically, traditional cooling schemes are limited by manufacturing constraints related to the manufacture of ceramic cores used to create the passageways and chambers within cooling circuits. New core production processes reduce such constraints imposed by hard tooling and enable the core to take new shapes and sizes. As a result, cooler operating temperatures within the rotor blade facilitate extending a useful life of the rotor blades in a cost-effective and reliable manner.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A turbine blade for improving dust mitigation, comprising:
    a leading edge, a trailing edge, at least one side all defining a pressure side extending between said leading edge and said trailing edge in a first direction, and a suction side extending between said leading edge and said trailing edge in a second direction;
    said blade extending radially from a blade root to a blade tip and horizontally from said leading edge to said trailing edge;
    said blade having a hollow cavity including a plurality of chambers for passage of cooling fluid;
    said plurality of chambers extending radially between said blade root and said blade tip;
    at least one of said chambers, having a tip turn which turns 90 degrees near said blade tip, said tip turn including radiused corners smoothly contoured about at least a horizontal axis extending from said leading edge to said trailing edge without discontinuous sides to inhibit recirculation areas.

2. The turbine blade of claim 1, said tip turn having a continuous inner wall and a continuous outer wall.

3. The turbine blade of claim 2, said continuous inner wall being curved about at east one axis.

4. The turbine blade of claim 3, said continuous inner wall being curved about at least two axes.

5. The turbine blade of claim 2, said continuous outer wall being curved about at least one axis.

6. The turbine blade of claim 5, said continuous outer wall being curved about at least two axes.

7. The turbine blade of claim 1, said tip turn being curved to approximate cooling flow stream lines.

8. The turbine blade of claim 1, said tip turn being curved to eliminate regions of flow recirculation.

9. A turbine blade for improving dust mitigation, comprising:
    a sidewall defining a pressure side and a suction side, said sidewall extending in two directions between a leading edge and a trailing edge;
    said sidewall extending radially from a root to a tip and defining a substantially hollow interior tip and horizontally from said leading edge to said trailing edge;

a plurality of chambers disposed within said hollow interior, said chambers extending radially;

a plurality of tip turns disposed at radial ends of said chambers;

said tip turns being smoothly contoured without discontinuous sides about at least two axes to reduce recirculation areas near said tips, at least one of which is a horizontal axis extending from said leading edge to said trailing edge.

10. The turbine blade of claim 9 further comprising a partition disposed between adjacent chambers.

11. The turbine blade of claim 10, said partition having an upper end being curved about at least one axis.

12. The turbine blade of claim 9, wherein one of said axes extends in a tangential or circumferential direction between the pressure and suction sides.

13. The turbine blade of claim 9 further comprising a third axis.

14. The turbine blade of claim 13, said third axis extending substantially in a radial direction.

15. The turbine blade of claim 9, said tip turn including a merged portion of a first chamber and a second chamber.

16. A turbine blade for mitigating dust build-up comprising:

a root end of said blade and a second tip end of said blade, a leading edge of said blade and a trailing edge;

a side all extending radially between said root end and said, tip end, and extending horizontally between said leading edge and said trailing edge;

said blade having a suction side and a pressure side;

generally hollow interior defined within said blade and having a plurality of chambers separated by partitions;

at least one tip turn having an upper surface disposed generally opposite said partition, said upper surface of said tip turn being smoothly contoured without discontinuous sides to curve about at least two axes at least one of which is a horizontal axis extending from said leading edge to said trailing edge.

17. The turbine blade of claim 16, said, tip turn being contoured to curve about a third axis.

18. The turbine blade of claim 17, wherein one of said three axes generally extends radially.

19. The turbine blade of claim 18, wherein one of said three axes generally extends tangentially or circumferentially between the pressure and suction sides.

20. The turbine blade of claim 19, wherein one of said three axes generally extends between said suction side and said pressure side.

* * * * *